United States Patent
Braginski

[11] 3,864,165
[45] Feb. 4, 1975

[54] FABRICATION OF FERRITE FILM FOR MICROWAVE APPLICATIONS

[75] Inventor: Aleksander I. Braginski, Pittsburgh, Pa.

[73] Assignee: Westinghouse Electric Corporation, Pittsburgh, Pa.

[22] Filed: Jan. 2, 1973

[21] Appl. No.: 320,250

Related U.S. Application Data

[63] Continuation-in-part of Ser. No. 069,658, Sept. 8, 1970, abandoned, which is a continuation-in-part of Ser. No. 867,699, Oct. 20, 1969, abandoned, and a continuation-in-part of Ser. No. 814,709, April 9, 1969, abandoned.

[52] U.S. Cl............... 117/235, 117/5.5, 117/106 R
[51] Int. Cl. ...................... C23c 11/08, H01f 41/14
[58] Field of Search......... 117/106 R, 107.2 R, 235, 117/239, 240, 5.5

[56] References Cited
UNITED STATES PATENTS

| | | | |
|---|---|---|---|
| 3,092,511 | 6/1963 | Edelman | 117/107.2 X |
| 3,224,911 | 12/1965 | Williams et al. | 117/106 X |
| 3,345,223 | 10/1962 | Reisman et al. | 117/106 X |
| 3,399,072 | 8/1968 | Pulliam | 117/106 X |
| 3,429,740 | 2/1969 | Mee | 117/106 |

OTHER PUBLICATIONS

The Condensed Chemical Dictionary, 7th Ed. Van Nostrand Reinhold Co., 1966, p. 958.

Primary Examiner—Leon D. Rosdol
Assistant Examiner—Harris A. Pitlick
Attorney, Agent, or Firm—R. T. Randig

[57] ABSTRACT

A method is disclosed for producing films of polycrystalline ferrites which are suitable for use in microwave applications. Chemical transport deposition techniques are employed wherein a temperature gradient between source and substrate materials is maintained while a reaction gas if flowed thereabout (in an open reactor).

16 Claims, 2 Drawing Figures

SOURCE COMPOSITION
$Mg_{0.79} Mn_{0.46} Cr_x Fe_{1.75-x} O_4$ 3,864,165

FABRICATION OF FERRITE FILM FOR MICROWAVE APPLICATIONS

CROSS-REFERENCE TO RELATED APPLICATIONS

This is a continuation-in-part of application Ser. No. 69,658 which was filed Sept. 8, 1970 and now abandoned which in turn was a continuation-in-part of application Ser. No. 867,699 filed Oct. 20, 1969, now abandoned, which application was also a continuation-in-part of application Ser. No. 814,709 filed Apr. 9, 1969 now abandoned, all of the applications being in the name of Aleksander I. Braginski.

BACKGROUND OF THE INVENTION

1. Field of the Invention

The present invention relates to a method of producing materials which are useful in making microwave gyromagnetic devices such as circulators, isolators, phase shifters and similar devices. More particularly the invention is directed to a method of producing a material for accomplishing circuit integration in which polycrystalline ferrite filled microstrip or strip line circuits are produced for use in solid state radars and other microwave systems.

The materials to which the method of the present invention is directed are those materials known as spinel ferrite having the general formula $Me^{+2}Fe_2^{+3}O_4$ and in which the ferrite or iron oxide is the major component, the $Me^{+2}$ is a metal selected from the transitional group of metals, and the material in film form assumes the spinel crystalographic structure.

2. Description of the Prior Art

At present, circuit integration for use such as phase-shifters and other devices in microwave systems employs a process in which ferrite chips are made by compounding the requisite materials into chip form and sintering the same at a relatively high temperature. These ferrite chips are then reduced to the desired thickness, between about 100 and 500 microns in thickness, by means of mechanical grinding. The very thin ferrite chip thus produced is then employed with the desired contours cut in the chip and subsequently the chip is metallized on the surfaces with the appropriate electrical conductors.

This procedure becomes increasingly difficult and time consuming with the reduction of the ferrite chip thickness. Moreover, making complicated chip contours is seriously handicapped for the later metallizing of the electrical circuit thereupon. While spinel ferrites and garnets are the most useful media at microwaves up to the millimetric wavelength range nonetheless at sub-millimetric wavelength, antiferromagnetic materials such as nickel-oxide, chromic oxide and others are of potential application importance.

Moreover, in the desire to micro-miniaturize these circuits for use in solid state radar and other microwave systems, film techniques are greatly desired. Until the present time attempts are vapor deposition of thin films onto the proper dielectric or semiconductor substrate material have proved to be unsuccessful from the standpoint of reproducibility. Moreover, it had been noted that there also existed a difference in the performance of vapor deposited polycrystalline films having compositions approaching the bulk materials and in addition the magnetic properties exhibited thereby appeared to be inferior to those of the bulk material.

SUMMARY OF THE INVENTION

The present invention relates to a method for depositing or fabricating polycrystalline film of ferrite materials onto a substrate material employing a chemical transport deposition process. It is imperative in practicing the method of the present invention, that not only must the material have the spinel crystalographic configuration but in addition, the $Fe_2O_4$ must be the major component and the iron can only be partially substituted by such other metals as aluminum and chromium. Moreover, while the general formula may be written $Me^{+2}Fe_2^{+3}O_4$, the $Me^{+2}$ component may be either a single component or a plurality of components which are selected from the transition metals as the same are classified in the periodic chart of the atoms.

Spinel ferrites are nore fully described in the publication "Ferromagnetism" by Bozorth D. Van Nostrand Company, Inc. commencing at page 224. Essentially the method includes the steps of assembling, in a reactor, a source material and a substrate material in a predetermined space relationship. The source material is usually formed of a bulk composition of the desired ferrite chemical composition and is reduced to a suitable thickness. The substrate material can be quartz, alumina, or another microwave dielectric or a semiconductor which may be eventually metallized. The preferred substrate material will have a close matching coefficient of thermal expansion to that of the source material. These materials are assembled in a close but spaced configuration within a reactor which is open at one end for the admission of gas thereto and open at the other end for exhausting the gas therefrom. A source of heat is applied to the materials contained within the reactor while at the same time a carrier gas and a reaction gas maintained at a constant total atmospheric pressure is admitted to the reactor and directed to flow about the source material and the substrate material. The source material is heated through a predetermined temperature within the range between about 1050°C and about 1350°C and the substrate material is maintained at a temperature within the range between about 20°C and about 200°C below the temperature of the source material. Under these conditions the source material is transported to and deposited on the substrate. When the desired ferrite film thickness is attained the reacting gas is shut-off and the substrate material is allowed to cool to room temperature by means of the removal of heat and the continued circulation of a carrier gas. Thereafter strip circuits may be metallized onto the surface of the ferrites and the device used in a microwave application, for example, a phase-shifter.

Accordingly, it is an object of the present invention to provide a method for fabricating polycrystalline thin films of less than about 1500 microns in thickness which are suitable for use in microwave applications.

Another object of the present invention is to provide a method for fabricating polycrystalline thin films of less than about 1500 microns in thickness employing a chemical transport deposition process utilizing a close spaced configuration in an open reactor.

A more specific object of the present invention is to provide a method whereby polycrystalline films of less than about 1500 microns in thickness may be deposited on a substrate material employing chemical transport deposition processing in which the bulk material of predetermined chemical composition is reacted under certain process parameters in order to deposit the same in a predetermined configuration on the substrate material.

Other objects will become apparent to those skilled in the art when read in conjunction with the following description and the drawings.

DESCRIPTION OF THE PREFERRED EMBODIMENT

Figure 1:
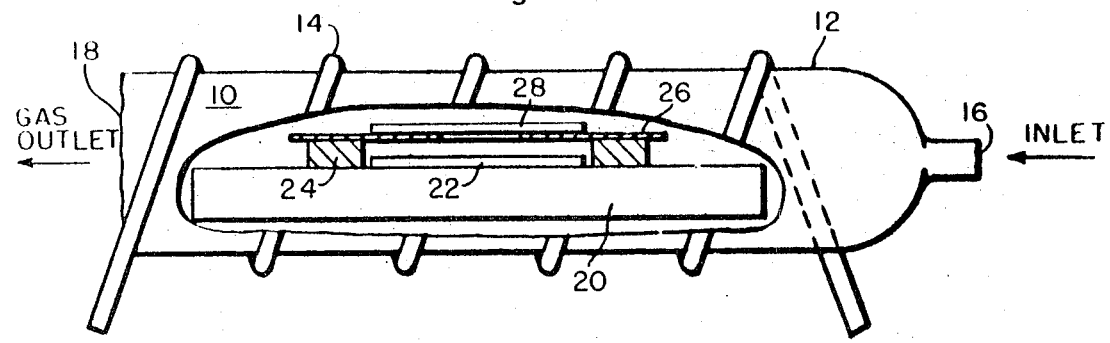
FIG. 1 is a schematic illustration of the apparatus employed in carrying out the process of the present invention.

The basis for the chemical transport deposition process employed herein is a transfer reaction of the type:

where the reaction equilibrium constant is temperature dependent. More particularly, the solid A may be transported through the phase C by a temperature gradient and may be represented as follows employing magnesium ferrite as the solid material:

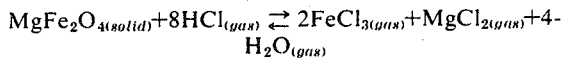

When the gas mixture on the right-hand side of the Equation, produced in equilibrium with the solid ferrite at the high temperature $T_1$, is passed into a lower temperature zone $T_2$ then the equilibrium in the above-identified equation shifts to the left-side of the equation and a ferrite deposit may be obtained in this zone. The temperature in the reaction are controlled by employing an inductive heating system wherein the source material is placed upon the surface of a susceptor maintained within an inductive heating coil and the substrate material is maintained in predetermined spaced relationship to the source material so that it will of necessity be at a lower temperature $T_2$ than that of a source material maintained at temperature $T_1$ in the susceptor contained within the inductive heating coil.

Referring now to the drawings there is illustrated a reactor shown generally at 10. The reactor essentially comprises a tube 12 about which an inductive heating coil 14 is wound in a well known configuration. The reactor 12 is provided with an inlet port 16 and an outlet port 18 for the admission and exhaustion of carrier and reaction gases therethrough. A heat susceptor 20 is disposed within the reactor tube 12 and within the confines of the inductive coil 14. The heat susceptor 20 is preferably formed of a material such as silicon carbide which is substantially inert to the reaction gas at the temperature employed in practicing the process of the present invention.

A source material 22 is disposed in seating engagement on the susceptor 20 and is usually in the form of a chip of predetermined thickness. A pair of spacer members 24 are placed on each side of the source material 22 in seating engagement on the susceptor 20. In the preferred embodiment of the present invention a mask 26 is disposed to rest on the spacer members 24 over the source material 22 and maintained in a close spaced relation to the source material 22. A substrate material 28 is dipsosed in seating engagement on the mask 26 upon which the source material will be eventually deposited. In the embodiment illustrated it will become apparent that using the mask 26 interposed between the source 22 and the substrate 28 a deposit of source material 22 having sharp contours conforming to the mask aperture can be formed on the substrate 28. Where, however, sharp contours are not required or not necessary, the substrate material 28 may be disposed in seating engagement on the spacer member 24 without the interposition of the mask 26.

As stated previously the method of the present invention is applicable for the fabrication of ferrite films suitable for use in microwave applications. Where utilization is contemplated within the X-band frequency, the magnesium ferrite or the magnesium-manganese ferrites are a suitable source for deposition on the substrate. The source materials are prepared by employing bulk material which has been sintered into a suitable chip form. The bulk materials are made by the standard ceramic processes, which include the mixing of powdered raw materials, pressing and sintering thereof into a dense mass as is well known. The completely reacted and sintered magnesium ferrites or magnesium-manganese ferrites are preferably in platelet or chip form having a thickness in the range between about 0.5 and about 4 millimeters in thickness.

It has been found that in preparing the source materials a more uniform film is deposited on the substrate, employing the process of the present invention, where the source material approaches 100% of the theoretical density. Consequently, the mixed powdered raw materials are subject to heat and pressure preferably simultaneously although good success has been realized by first pressing and then sintering. Typically, pressures in the range of from about 8,000 psi to about 10,000 psi with temperatures of from 1200°C to about 1750°C and for time periods of up to about 8 hours have been employed with good success. However, any method which will provide neon theoretical density will be effective for providing a uniform film when following the teachings of the present invention.

As will be demonstrated hereinafter with respect to example 1, the composition of the deposited film will closely approximate that of the source material. It is for this reason that it is desired to approach 100% of theoretical density in compounding the bulk material so that substantially an identical composition as that of the source material will be deposited in the film material which is transported to the substrate. Since variations in composition will cause variations in the magnetic characteristics nonetheless the data which is set forth hereinafter clearly demonstrate that the deposited film exhibits magnetic characteristics approaching that of the bulk compositon. As has been pointed out, useful magnetic chatacteristics are displayed by films which vary somewhat from the composition of the source material but such characteristics are usually within the envelope of magnetic characteristics of the source material. The thin film, however, which is deposited usually displays better magnetic characteristics for example, narrower Resonance Line width.

It will be appreciated that since the source material is disposed to lie on the susceptor within the reactor it will essentially attain the temperature approaching that of the susceptor material when subject to the action of the induction coil. The spacer members are preferably made of alumina or quartz and may range in thickness from about 0.06 to 1 centimeter in thickness and preferably about 0.1 to 0.3 centimeters in thickness. Quartz or alumina may be employed as the material for the mask C in order to obtain the desired contour of the ferrite deposit. Typically, the mask has a thickness not exceeding about 0.5 millimeters.

A typical substrate material found useful in the process of the present invention is highly polished, eventually metallized alumina. Where it is desired to closely match the coefficient of thermal expansion of the substrate material and the ferrite film material, it has been found the magnesium silicate (Forsterite) or platinum substrate works well with magnesium-manganese ferrite film. The total distance between the upper surface of the source and the substrate surfaces is regulated by adjusting the height of the spacer members. This space is regulated so that a selected temperature difference between them exists. Such temperature difference should be within the range of between 20°C and 200°C, that is the spacer member should be of such a thickness that the temperature difference between the source material carried on the susceptor and the substrate material is such that a temperature of the substrate material is maintained within the range between 20°C and about 200°C lower than the temperature to which the source material is heated. It will be appreciated that the deposition rate is inversely proportional to the spacing, that is, with closer spacing the deposition rate is high and vice versa.

The assembled materials contained within the reactor are heated in the reactor while flowing a carrier gas and a reaction gas mixture therethrough preferably at atmospheric pressure or at some lower pressure depending upon the deposition rate desired and the materials employed. Moreover, oxygen may be admixed with the carrier gas and good results have been obtained employing helium containing up to 20% by volume of oxygen as set forth in the examples. The carrier gas may be an inert gas for example, helium, argon or nitrogen or the carrier gas may be completely oxygen except for the reaction gas, depending on the ferrite composition, the desired magnetic properties, and the heat susceptor lifetime. Films deposited in an oxygen-free atmosphere can be additionally annealed in a separate furnace in order to insure the proper oxygen content. Typical carrier gas flows in the system of about 2 inches in diameter are 0.01 to about 10 liters per minute and preferably from 2.0 liter per minute throughout the time that the materials are held at elevated temperatures.

As stated, a reaction gas is utilized to complete the chemical transport deposition of the source material onto the substrate material. The reaction gas used is HCl but this carrier gas may be replaced by other halide gases for example, HBr or HI or such diatomic gases as $Cl_2$, $Br_2$ and $I_2$. The reaction gas concentration is preferably maintained within the range between 0.1 to 10 percent by volume of the carrier gas depending upon the desired deposition rate.

When the induction heating coil is energized, the temperature of the source material contained on the susceptor is raised to a temperature within the range between about 1150°C to 1350°C. By maintaining the source temperature within the range stated the substrate temperature can be adjusted to a temperature within the range between about 1050°C and about 1300°C. Particularly good results have been obtained when the source temperature is within the range between 1200°C and 1300°C and the temperature of the substrate is within the range between about 20°C and about 150°C below the temperature of the source material, employing the foregoing conditions ferrite films have been deposited at a rate between 1 and 300 microns per hour and where the optimum temperature conditions are employed a deposition rate of between about 10 to 100 microns per hour is obtained. Film adhesion to the substrate has been excellent and the density of such deposits closely approaches the theoretical density.

By the process above disclosed, both magnesium ferrite and magnesium-manganese ferrite films have been deposited on various substrates. Magnetic properties of the deposits are comparable to those of the bulk materials of similar compositions. For example, the induction $B_m$ in a field of 20 oersteds has been within the range between 1500 and 3000 gauss. Coercive forces within the range between 1 to 10 oesteds are typical and a remanence ratio approaching 0.8 on thermally matched substrates for square loop compositions. Reference is directed to the following examples which typify the method of the present invention.

EXAMPLE I

Source Composition $Mg_{0.94}Mn_{0.39}Fe_{1.67}O_4$

| | |
|---|---|
| Susceptor Temperature | 1250 ± 5°C |
| Source-Substrate Spacing | 1.5 mm. |
| Total Gas Flow | 1230 cc/min. |
| HCl conc. | 8% by Vol. |
| $O_2$ conc. | 0.25% by Vol. |
| Carrier Gas | Helium |
| Deposition Time | 210 min. |
| Deposition Rate | 4.63 mils/hr. |
| Thickness | 16.2 mils |
| Shape | Spot 0.2 inch diameter |
| Substrate | Alumina |
| Mask | Alumina |
| Results: | |
| Saturation Magnetization | $4\pi M_s = 2840$ gauss (g = 2.04) |
| Resonance Line Width | $\Delta H = 240$ $O_e$ (−3db) |

EXAMPLE II

Source Composition $Mg_{0.94}Mn_{0.39}Fe_{1.67}O_4$

| | |
|---|---|
| Susceptor Temperature | 1250 ± 5°C |
| Source-Substrate Spacing | 3 mm. |
| Total Gas Flow | 2460 cc/min. |
| HCl conc. | 4% by Vol. |
| $O_2$ conc. | 6% by Vol. |
| Carrier Gas | Helium |
| Deposition Time | 60 min. |
| Deposition Rate | 3.9 mils/hr. |
| Thickness | 3.9 mils. |
| Shape | Strip 40 mils wide 1" long |
| Substrate | Alumina |
| Results: | |
| High Q Cavity at 9.066 $GH_z$ | |
| Dielectric permittivity $\epsilon = 14.5$ | |
| Dielectric loss tgt: tg.$\delta\epsilon = .0005$ | |

EXAMPLE III

Source Composition $Mg_{0.94}Mn_{0.39}Fe_{1.67}O_4$

| | |
|---|---|
| Susceptor Temperature | 1250 ± 5°C |
| Source-Substrate Spacing | 15. mm. |
| Total Gas Flow | 2360 cc/min. |
| HCl conc. | 1.7% by Vol. |
| $O_2$ conc. | 5.3% by Vol. |
| Carrier Gas | Helium |

EXAMPLE III-Continued

| Source Composition $Mg_{0.84}Mn_{0.30}Fe_{1.07}O_4$ | |
|---|---|
| Deposition Time | 20 min. |
| Deposition Rate | 1.06 mils/hr. |
| Thickness | 0.35 mils |
| Shape | Strip 0.2 inch wide 15/8 inch long |
| Substrate | Platinum |
| Mask | — |
| Results: | |
| Maximum induction $B_{max}(H_{max}) = 2460$ gauss | |
| $H_{max} \cong 19$ oersteds | |
| Remanence Ratio Br/Bm = 0.76 | |
| Coercive Force Hc = 2.65 Oersteds | |

The foregoing examples of the use of magnesium manganese ferrite films employing the process of the present invention are effective for producing films exhibiting magnetic characteristics approaching those of the bulk material. The magnesium-manganese ferrites have a saturation magnetization in the range of about 1600 to 3000 gausses which makes them mainly suitable for use in X-band applications. However, at longer wavelengths, especially in the C, S and L band lower saturation magnetization values are necessary in order to insure low intrinsic losses in the microwave device.

One presently known method of decreasing the magnetization in the bulk ferrite materials consists in the partial substitution of magnetic ferric ions located at the octahedral sites of the ferrite spinel lattice by a nonmagnetic aluminum ion in the plus three state. It has been found however that when aluminum in the plus three state is incorporated into the magnesium-manganese ferrite source materials realistic deposition rates could not be achieved when employing the method of the present invention, even when temperatures in excess of 1300°C were employed.

It has been found that in order to prepare low magnetization films suitable for the C, S and L band, the aluminum ions in the plus three state may be substituted by the chromic ions in the magnesium-manganese ferrite lattice thereby making it possible to deposit polycrystalline magnesium-manganese ferrochromite films. This results from the fact that the chromium oxide reacts more easily and at lower temperatures with the reaction gas, for example, HCl than does $Al_2O_3$. it has been found that when preparing the source material from powders, predetermined amounts of chromic oxide, magnesium chromite, and manganese chromite may be combined in producing the source material having the desired chemical composition. By employing these components the source chips may be sintered at about 1400°C and form the desired chemical compound which is utilized as the source material in the process of the present invention.

EXAMPLE IV

Into a reactor tube having a diameter of about 50 millimeters and about which was wound an induction heating coil, a silicon carbide susceptor was placed and on the surface thereof a source material having the following composition was arranged in seating engagement thereon.

$$Mg_{0.79}Mn_{0.46}Cr_xFe_{1.75-x}O_4$$

The value of X in the foregoing equation was 0.15, 0.28, 0.42, 0.52, 0.80, and 0.94. Spacer members were added to each side of the source material and an alumina mask was interposed on the spacer members. A highly polished alumina substrate was arranged on top of the mask to provide a spacing of two millimeters between the top surface of the source material and the bottom surface of the substrate material. The contents of the reactor were heated so that the source was maintained at a temperature between 1225° ± 5°C while the substrate was maintained at a temperature of 1050°C. During the entire period HCl reaction gas was admitted to the reactor at a rate of 40 cubic centimeters per minute and helium was the carrier gas flowing at a rate of 2150 cc per minute.

Reference is directed to Table I wherein the test results are summarized.

TABLE I

Deposition of Ferrochromite Films - Rates and Magnetic Properties

| x | Deposition Rates | | Deposition Time min. | Film Thkn. $\mu$ | $H_m \cong 19$ Oe | | |
|---|---|---|---|---|---|---|---|
| | Mass $^{-1}cm^2$ mgh | Thkn $\mu h^{-1}$ | | | $B_m$ G | Br/Bm | $H_c$ Oe |
| 0.15 | 13.8 | 30.5 | 10 | 5.1 | 1830 | 0.61 | 4.2 |
| 0.28 | 11.7 | 26.5 | 10 | 4.4 | 1600 | 0.59 | 5.5 |
| 0.42 | 9.0 | 20 | 15 | 5.0 | 1380 | 0.51 | 4.1 |
| 0.52 | 7.9 | 22 | 18 | 6.7 | 1150 | 0.55 | 3.8 |
| 0.80 | 5.4 | 12 | 26 | 5.2 | 980 | 0.50 | 6.6 |
| 0.94 | 2.3 | 9 | 30 | 4.4 | 780 | 0.65 | 6.8 |

From Table I it is seen that the rate at which the films have been deposited are quite realistic and that substantially any film thickness can be suitably deposited by the method of the present invention. Reference to the magnetic data makes it clear that the thin films deposited by employing the method of the present invention closely approach the magnetic characteristics of the bulk material.

It may be noted in Table I that as the amount of chromium in the deposit increases, the mass deposition rate and the thickness rates decrease. It is believed that this results mainly from the fact that chlorination by HCl of the $Cr_2O_3$ is much slower making the process less attractive for use where low magnetization films ($4\pi M_s$ x 600 to 1200G) are required for C- and S- band applications.

In order to increase the deposition rates it has been found that the halogen gases can be used as the reaction gas in the following manner:

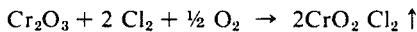

Since the chromium oxychloride is volatile it can be transported and deposited on the substrate in the manner set forth hereinbefore.

From the above equation it becomes clear that the reactor is favored with high oxygen concentrations. Thus using diatonic chlorine as their reaction gas in an amount of 4 volume percent and oxygen as the carrier gas, the same constituting the balance, namely, 96 volume percent, highly uniform films have been attained which exhibited good magnetic characteristics.

Reference may be had to the following example which directly compares the use of HCl as the reaction gas and $Cl_2$ as the reaction gas in the production of ferrochromite films of the source composition:

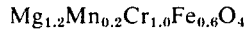

| Process Parameter | Reaction Gas HCl | $Cl_2$ |
|---|---|---|
| Susceptor Temperature °C | 1250 ± 5 | 1250 ± 5 |
| Source-substrate spacing, mm | 3 | 3 |
| Total gas flow, cc/min. | 2300 | 2500 |
| HCl or $Cl_2$ concentration, % by vol. | 4.5 | 2.6 |
| $O_2$ concentration, % by vol. | 0.5 | 10 |
| Carrier gas | He | He |
| Deposition time, hours | 8.5 | 2.5 |
| Deposition rate, $R_h$, microns/hour | 33 | 130 |

From the foregoing data it is clear that where high concentrations of chromium are required the use of diatomic halogen gasses is effective for providing improved deposition rates. This is accomplished without detrimentally affecting the magnetic properties as set forth hereinafter.

| Parameter at 25°C | Reaction Gas HCl | $Cl_2$ |
|---|---|---|
| Saturation Magnetization; $4\pi M_s$, O | 1100 | 1050 |
| Resonance Linewidth, $\Delta H$, Oe (−3db) (~9.2 GHz) | Too high to measure | 160–170 |
| Dielectric Loss, tg$\delta$ $\epsilon$ (~9.2 GHz) | .010 | .003 |

Figure 2:
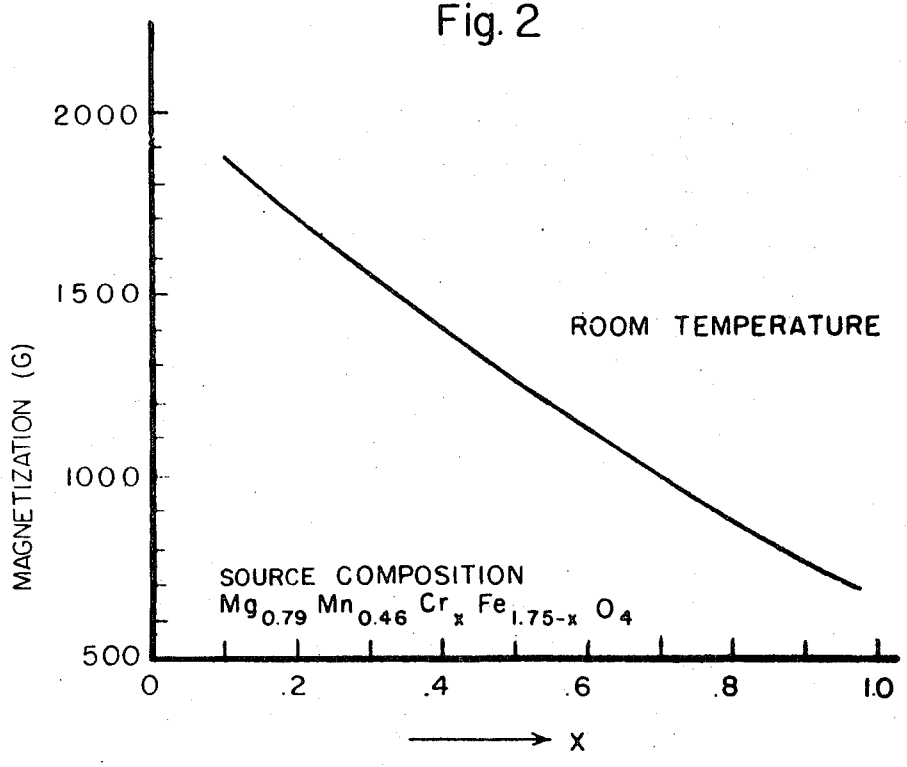
FIG. 2 illustrates the relation between chromium content and the magnetic saturation.

As stated hereinbefore the present invention finds particular use in microwave applications. Where the chromium content is varied in the basic magnesium-manganese ferrite the saturation magnetization accordingly varies with the amount of the chromium. This is best illustrated by reference to FIG. 2 which shows the relationship between the room temperature magnetization and the amount of chromium present within the manganese-magnesium ferrite.

Thus by selecting the desired chemical composition for the source material and forming the source material to this desired composition magnesium-manganese ferrochromite films can be deposited which are suitable for use in any of the desired wavelengths including use in the L, S, C and X-bands.

Where the term reaction gas is utilized in the specification and claims, it will be appreciated that such term includes any halogen containing gas either in a separate or combined form or in the monatomic or higher atomic state.

I claim:

1. In the chemical transport deposition method of producing on a substrate polycrystalline films of spinel ferrites having a thickness of less than about 1500 microns and which are suitable for use in microwave applications, the steps comprising:
   assemblying in a reactor a multicomponent source material of a spinel ferrite selected from the group consisting of magnesium ferrites, manganese-magnesium ferrites, and transitional metal ferrites and a substrate material in spaced relation to one another, the substrate material being suitable for use in a microwave application,
   flowing a carrier gas and a reaction gas through the reactor in contact with said source material and said substrate material said carrier gas being selected from the group consisting of inert gases and oxygen and mixtures thereof and said reaction gas being selected from the group consisting of the halogens and halogen hydrides, heating the materials in the reactor with a single heat source to a temperature sufficiently high to cause a reaction between the source material and the reaction gas, maintaining the substrate at a temperature within the range between 20°C and 200°C below the temperature of the source for a predetermined length of time whereby a film of the desired thickness of the source material is deposited on the substrate and thereafter cooling the substrate with the deposited film thereon to room temperature.

2. The process of claim 1 in which a portion of the ferrite ions are substituted with chromium by including by reaction with the ferrite a predetermined amount of at least one material selected from the group consisting of chromic oxide, magnesium chromite and manganese chromite within the source material.

3. The process of claim 2 in which the reaction gas is selected from the group consisting of chlorine, bromine and iodine.

4. The process of claim 2 in which the carrier gas is oxygen and the reaction gas is present in an amount of about 4 volume percent.

5. The process of claim 1 in which the temperature of the source is maintained within the range between about 1050°C and 1350°C.

6. The process of claim 1 in which the reaction gas is present within the range between 0.1% and 10% by volume of the carrier gas.

7. The process of claim 1 in which the carrier gas contains up to 20% by volume of oxygen therein and said carrier gas is metered to the reactor at a rate between about 0.01 and 10 liters per minute for a reaction vessel of about 2 inches in diameter during the reaction.

8. The method of claim 1 in which the substrate material has a coefficient of thermal expansion approaching that of the ferrite material.

9. In the chemical transport deposition method of producing on a substrate polycrystalline films of spinel ferrites having a thickness of less than about 1000 microns and which are suitable for use in microwave applications, the steps comprising:
   assemblying in a reactor a multicomponent source material of a spinel ferrite selected from the group consisting of magnesium ferrites, manganese-magnesium ferrites, and transitional metal ferrites, a mask in predetermined spaced relation and a substrate material in seating engagement on the mask, the substrate material being suitable for use in a microwave application, flowing a carrier gas and a gas which is reactive substantially only with the source material through the reactor in contact with at least the source and the substrate said carrier gas being selected from the group consisting of inert gases and oxygen and mixtures thereof and said reactive gas being selected from the group consisting of the halogens and halogen hydrides, applying heat to the materials contained in the reactor for securing the temperature of the source material to a range between 1200°C and 1350°C while maintaining the substrate at a temperature within the range between 20°C and 200°C below the temperature of the source for a predetermined period of time and thereafter cooling the substrate with the deposited film thereon to room temperature.

10. The process of claim 2 in which the reaction gas is chlorine.

11. The process of claim 10 in which the carrier gas contains up to 20% by volume of oxygen.

12. The process of claim 10 in which the carrier gas is substantially all oxygen.

13. The method of claim 9 in which a portion of the ferrite ions are substituted with chromium and the reaction gas is selected from the group consisting of chlorine, bromine and iodine.

14. The process of claim 9 in which the carrier gas is substantially all oxygen.

15. The process of claim 13 in which the reaction gas is chlorine and the carrier gas is substantially all oxygen.

16. The process of claim 1 in which the carrier gas includes in excess of 20 volume percent oxygen in admixture with an inert gas selected from the group consisting of helium, argon and nitrogen.

* * * * *